(12) United States Patent
Schrattenecker

(10) Patent No.: US 6,354,938 B1
(45) Date of Patent: Mar. 12, 2002

(54) STRAW-CUTTING MACHINE FOR THE CHOPPING OF STALKS

(76) Inventor: Franz Schrattenecker, Edenaichet 21, A-4773 Eggerding (AT)

(*) Notice: Subject to any disclaimer, the term of this patent is extended or adjusted under 35 U.S.C. 154(b) by 0 days.

(21) Appl. No.: 09/320,608

(22) Filed: May 26, 1999

(30) Foreign Application Priority Data

May 26, 1998 (DE) .......................................... 198 23 489

(51) Int. Cl.[7] .............................................. A01F 12/40
(52) U.S. Cl. .......................................... 460/112; 241/47
(58) Field of Search .................................. 460/111, 112, 460/73, 78, 113, 119, 142; 241/47, 101.742, 243, 605

(56) References Cited

U.S. PATENT DOCUMENTS

| | | | | |
|---|---|---|---|---|
| 2,626,159 A | * | 1/1953 | Thompson | 460/112 |
| 2,842,175 A | * | 7/1958 | Thompson | 241/243 |
| 2,865,416 A | * | 12/1958 | Hetteen | 241/243 |
| 3,186,460 A | * | 6/1965 | Frederick | 460/111 |
| 4,637,406 A | * | 1/1987 | Guinn et al. | 241/101.7 |
| 4,646,757 A | * | 3/1987 | Schmitt et al. | 130/27 |
| 4,998,679 A | * | 3/1991 | Bender | 241/243 |
| 5,042,973 A | * | 8/1991 | Hammarstrand | 460/112 |
| 5,232,405 A | * | 8/1993 | Redekop et al. | 460/112 |
| 5,833,533 A | * | 11/1998 | Roberg | 460/112 |
| 5,928,080 A | * | 7/1999 | Jakobi | 460/112 |
| 6,120,373 A | * | 9/2000 | Schrattenecker | 460/112 |
| 6,126,098 A | * | 10/2000 | Schrattenecker | 241/47 |

FOREIGN PATENT DOCUMENTS

| | | | |
|---|---|---|---|
| DE | 2749046 | * | 5/1979 |
| DE | 19530028 | | 2/1997 |

* cited by examiner

*Primary Examiner*—Robert E. Pezzuto
*Assistant Examiner*—Nathan Mammen
(74) *Attorney, Agent, or Firm*—Dilworth & Barrese LLP

(57) ABSTRACT

A straw-cutting machine serves to chop stalks, preferably to chop straw behind the straw-walker end (1) of a combine harvester. It possesses a straw-cutting machine housing (4) in which a rotor (5) provided with cutting tools (7) and a drive is pivoted, a guide plate (12) which forms a straw-cutting machine bottom and an outlet (13). To improve such a straw-cutting machine, counter-cutters (11) are provided on the straw-cutting machine bottom (12). Preferably, further counter-cutters (23) are provided in the region of the inlet gap (22) (FIG. 1).

10 Claims, 3 Drawing Sheets

STRAW-CUTTING MACHINE FOR THE CHOPPING OF STALKS

BACKGROUND OF THE INVENTION

The invention relates to a straw-cutting machine for the chopping of stalks, preferably for the chopping of straw behind the straw-walker end of a combine harvester, in accordance with a straw-cutting machine housing (4) in which a rotor (5) provided with cutting tools (7;30) and a drive is pivoted, having a guide plate forming a straw-cutting machine bottom (12) and an outlet (13).

A rotor provided with cutting tools and a drive is pivoted in the straw-cutting machine housing. The cutting tools can be cutters which can be disposed in a fixed position or hung in a floating or free-swinging manner. But rotating catch plates, which can be disposed in a fixed position or hung in a free-swinging manner, can also be used as the cutting tools. The straw-cutting machine housing is generally located behind an inlet funnel whose front wall and rear wall run towards the straw-cutting machine casing and limit the inlet region into the straw-cutting machine housing covered by the rotor. In the region of the rotor, there is furthermore provided a guide plate forming a straw-cutting machine bottom. Furthermore, an outlet exists through which the cut stalks can leave the straw-cutting machine. Above this outlet, an air outlet hood can be disposed. This can be limited towards the inlet funnel and the outlet at its upper and/or lower edge regions by accumulation plates. The accumulation plates preferably extend very closely, that is, for example, up to around 5 to 10 mm, towards the circuit of the cutting tools.

A straw-cutting machine in accordance with the description above is known from DE-OS 195 30 028. In this known straw-cutting machine, the air ring in the form of a mantle enclosing the rotor and rotating with it is broken by the straw guide plate located under the straw-walker end and forming the rear wall of the inlet funnel being curved in an arc-shape in such a manner that the upper curved end lies below the straw-walkers while the lower end tapers off roughly perpendicularly into the inlet of the straw-cutting machine housing.

SUMMARY OF THE INVENTION

It is the object of the invention to improve a straw-cutting machine of the type first given.

This object is solved in accordance with the invention by counter-cutters being provided on the straw-cutting machine bottom. The counter-cutters are preferably disposed in a cutter bar. The counter-cutters are preferably located in the outlet region of the straw-cutting machine bottom or of the guide plate, that is in the region of the end of the straw-cutting machine bottom or of the guide plate. The outlet preferably follows on directly from the counter-cutters.

Advantageous embodiments are described below.

Preferably, further counter-cutters are provided in the region of the inlet gap. These counter-cutters are also preferably disposed in a cutter bar. They are preferably located directly behind the inlet gap of the straw-cutting machine. In that the counter-cutters are provided both in the rear region of the straw-cutting machine bottom and in the front region, the straw-cutting effect is substantially enhanced.

Preferably, the counter-cutters protrude into the circuit of the cutting tools. To make this possible, the cutting tools are provided with corresponding slits which are penetrated by the counter-cutters. This is described in U.S. Pat. No. 6,120,373 to which reference is herewith expressly made and whose content—also in the other aspects—is herewith incorporated by reference in the present application.

Another advantageous embodiment is characterized in that slots are disposed in the straw-cutting machine bottom. This is described in detail in U.S. Pat. No. 6,126,098 to which reference is herewith expressly made and whose content—also in the other aspects—is herewith incorporated by reference in the present application. These slots are preferably provided over the width of the rotor. They have the effect that the ascending air current generated by the narrowing of the rotor's centrifugal circle and by the counter-cutters is deflected outwards or broken in the inlet region of the straw. In this way, a suction effect is achieved by the rotation of the rotor instead of the ascending air current which impairs the acceptance of the straw. In this way, the acceptance of the straw by the straw-cutting machine is made easier.

Preferably, the slots are penetrated by moving tines. These tines prevent the cut stalks from being able to accumulate in the region of the slots which might impair the slots so that they would lose their venting effect. Instead of the tines, different types of tools can be used which keep the slots free and/or transport the cut stalks on.

The tines are preferably disposed on a drivable roller. They move in the direction of movement of the cut stalks, that is in the direction of the straw-cutting machine, by means of which the cut stalks are transported on to the straw-cutting machine.

BRIEF DESCRIPTION OF THE DRAWINGS

Embodiments of the invention are described in detail below by means of the enclosed drawing in which.

Figure 1:
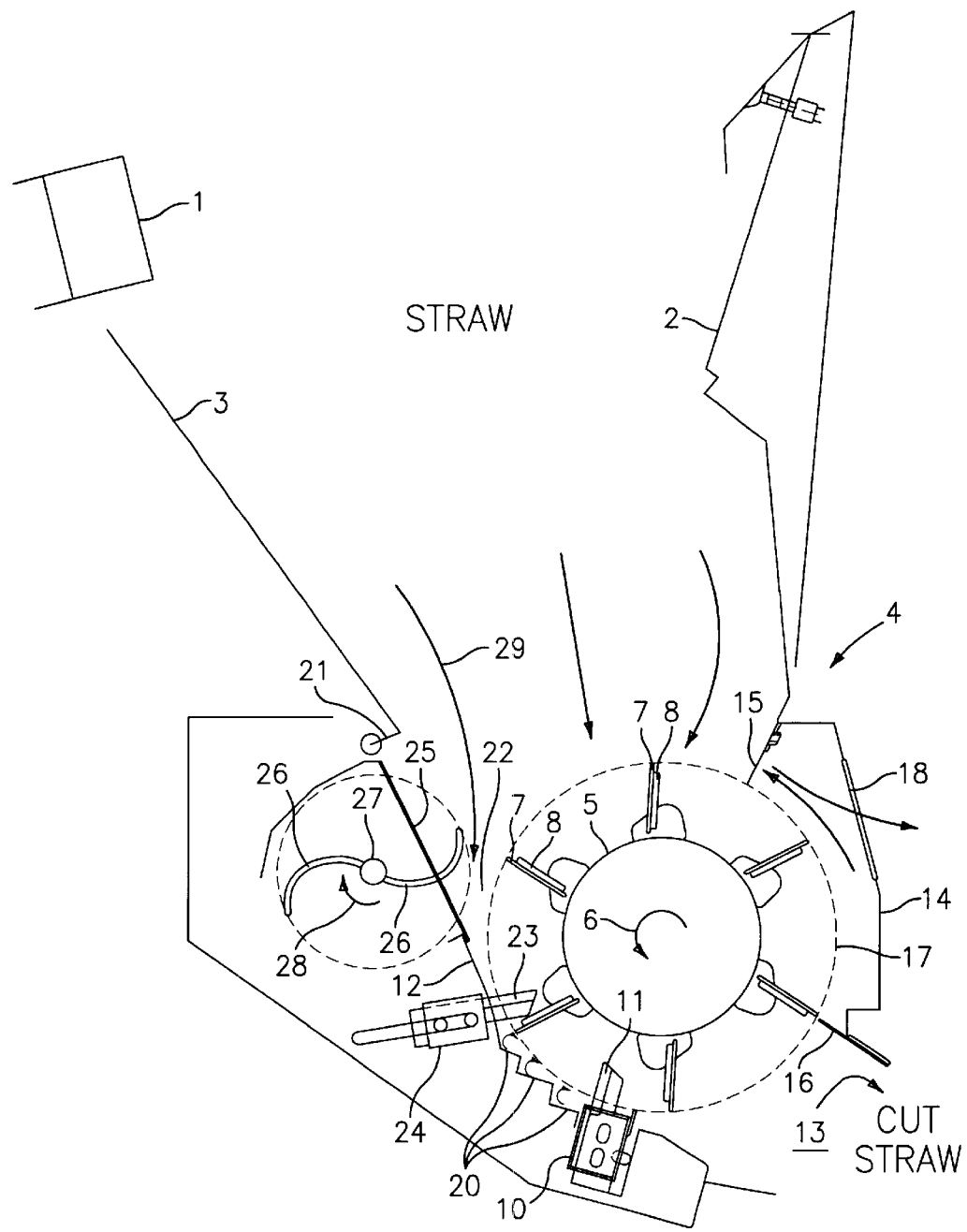
FIG. 1 shows a first embodiment of a straw-cutting machine with rotating catch plates in a schematic side view.

DESCRIPTION OF THE PREFERRED EMBODIMENTS.

Under the end of a straw-walker 1 of a combine harvester, the funnel-shaped inlet housing for the straw is disposed whose front wall and rear wall 3 taper off towards the straw-cutting machine housing 4 and limit the inlet region into the straw-cutting machine housing covered by the rotor 5. On the jacket of the rotor 5 rotating in the direction of the arrow 6, cutting tools 7 are disposed which are designed as catch plates and whose holding plates 8 can be mounted in a fixed position or rotatable around axes on the rotor jacket 5.

In the outlet region of the straw-cutting machine housing, a cutter bar 10 is disposed in a fixed manner on the housing in which the counter-cutters 11 interacting with the catch plates 7 are mounted.

The region between the lower end 21 of the rear wall 3 of the funnel-shaped inlet housing and the cutter bar 10 is closed by the straw-cutting machine bottom 12 forming a part of the straw-cutting machine housing 4. The straw-cutting machine bottom 12 forms a guide plate for the cut stalks.

In the region of the inlet slit 22 of the straw-cutting machine, further counter-cutters 23 are provided which are disposed on a second cutter bar 24. The cutters 11 and 23 can each be adjusted, that is moved towards the axis of rotation of the rotor 5 or away from it. The counter-cutters 11 and 23 protrude into the circuit 17 of the cutting tools 7. To make this possible, the cutting tools or catch plates 7 possess a corresponding slot.

The straw-cutting machine bottom 12 possesses in the region between the cutter bars 24 and 10 step-shaped elevations 20 which work as accumulation plates and additionally break and eddy the obstructing ascending air current.

Furthermore, in the straw-cutting machine bottom 12, in the region between the lower end 21 of the rear wall 3 and the cutter bar 24, slots 25 are provided which run in each case in the longitudinal direction and whose plurality essentially extends over the width of the rotor. The slots 25 are penetrated by moving tines 26 which are disposed on a roller (feed roller) 27 drivable in the direction of arrow 28. As can be seen from FIG. 1, those parts of the tines 26 which penetrate the slots 25 move towards the rotor or the counter-cutters 23. They transport the cut stalks in the direction of the arrow 29 into the inlet gap 22 of the straw-cutting machine. In this way, the curved tines 26 of the feed roller 27 prevent cut stalks from being able to accumulate in the region of the inlet gap 22. These cut stalks are further transported from there into the inlet slit of the straw-cutting machine. The tines 26 are curved in the direction of rotation 28 in the manner visible from FIG. 1.

Above the outlet 13 of the straw-cutting machine, a hood 14 is disposed which is provided at its upper end with an accumulation plate 15 and at its lower end with another accumulation plate 16 which are fixed in the manner shown on the circuit 17 covered by the cutting tools 7. Said accumulation plates 15 and 16 essentially run perpendicularly to the tangent on the circuit 17; that is, they essentially point towards the axis of rotation of the rotor. The accumulation plates 15 and 16 end a very short distance of around 5 to 10 mm away from the circuit 17. The hood 14 is provided on its front side with one or more perforations or venting slits 18 through which the air can exit and flow out without problem.

Figure 2:
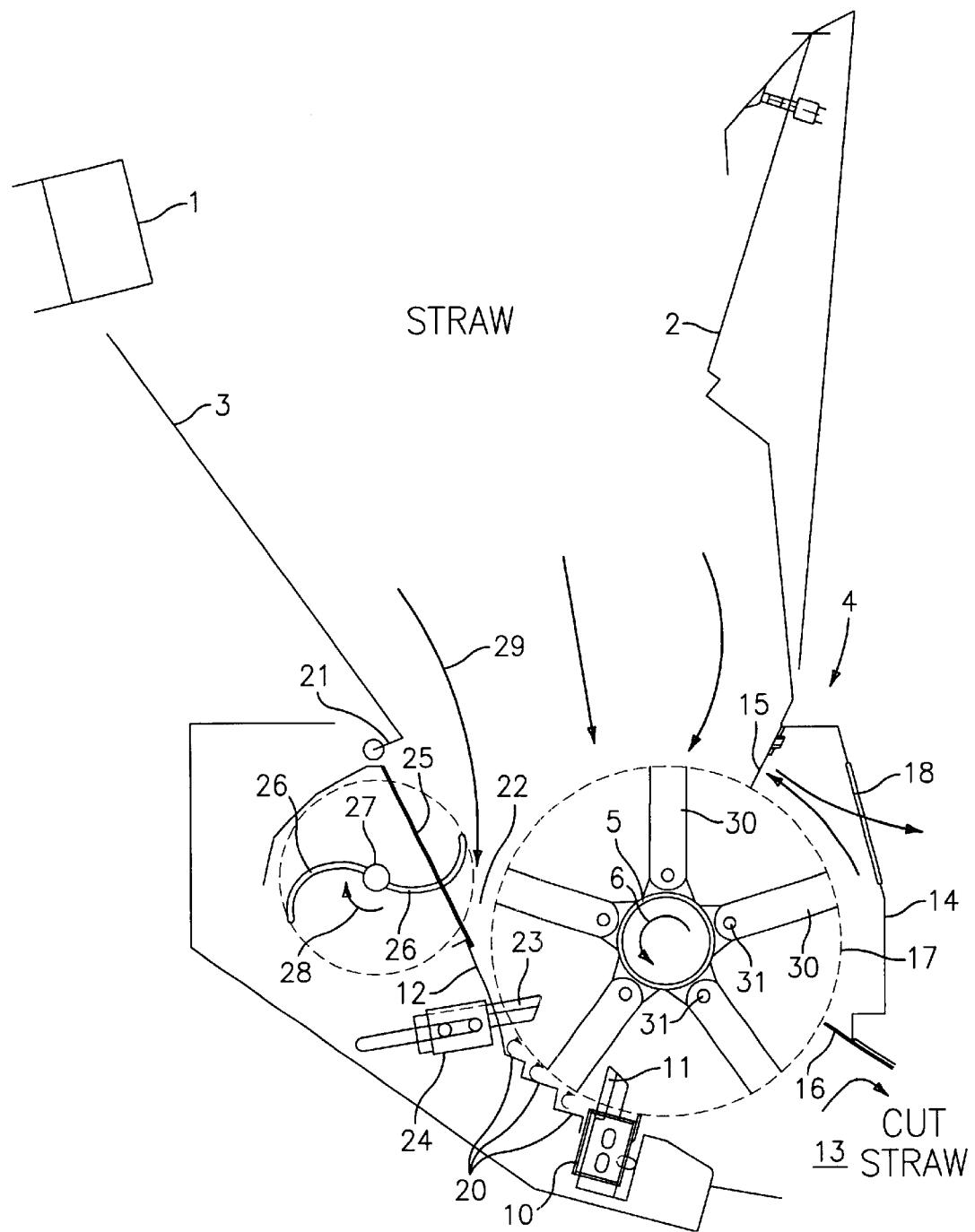
FIG. 2 shows a second embodiment with cutters hung in a floating manner.
Figure 3:
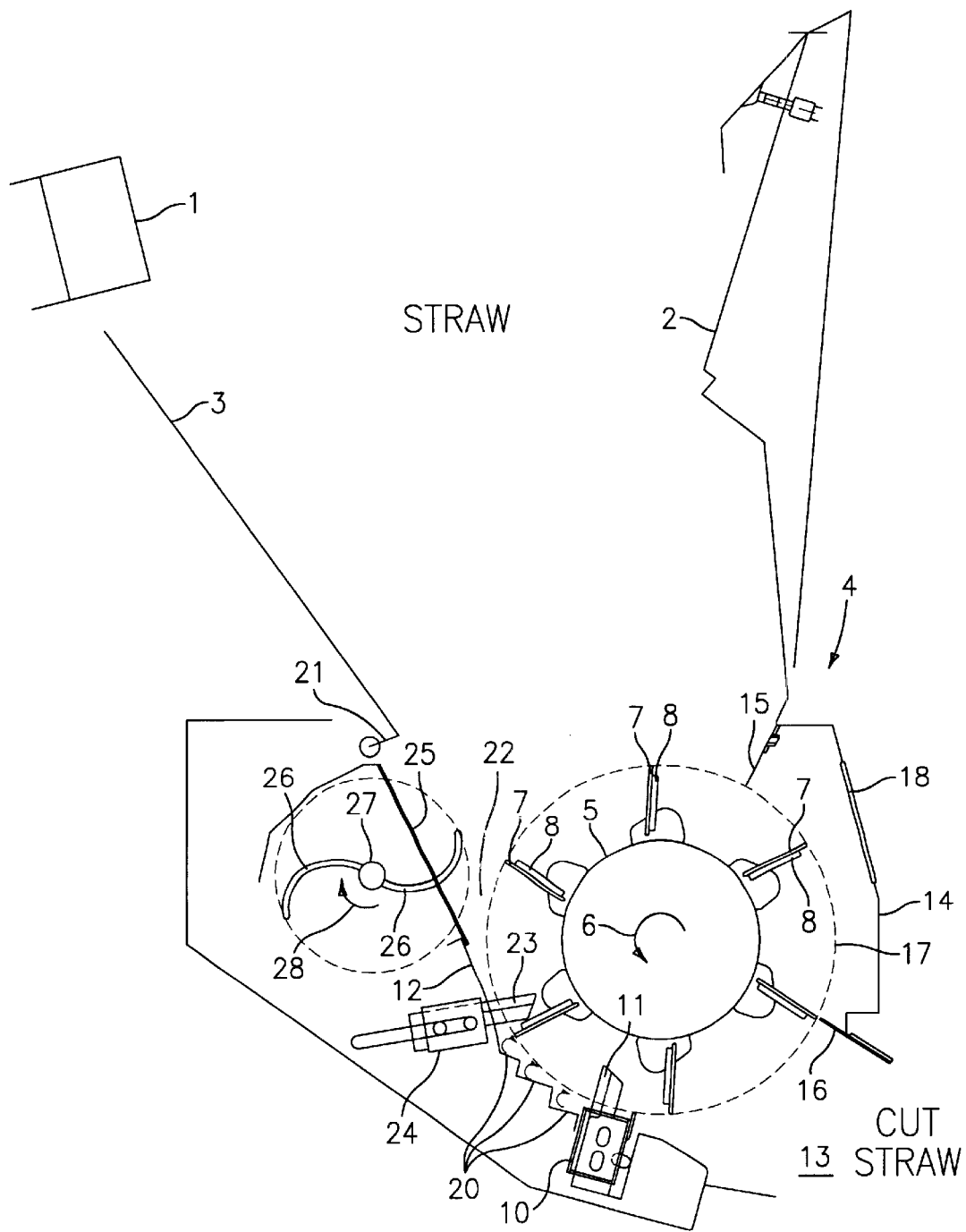
FIG. 3 shows the embodiment of FIG. 1 in a representation without the arrows indicating the airflow.

In the embodiment of FIG. 2, instead of the catch plates 7, flail cutters 30 exist which are hung in a floating manner on axles 31.

What is claimed is:

1. A straw-cutting machine for the chopping of stalks having a straw-cutting machine housing (4) in which a rotor (5) provided with cutting tools (7;30) and a drive is pivoted, having a guide plate forming a straw-cutting machine bottom (12) and having an outlet (13), wherein
   a first row of counter-cutters (11) is provided on the straw-cutting machine bottom (12),
   a second row of counter-cutters (23) is provided in a region of an inlet gap (22) defined between the bottom (12) and rotor (5) upstream of said first row of counter-cutters (11) in a direction of stalk flow,
   slots (25) are disposed in the straw-cutting machine bottom (12), and the slots (25) are penetrated by moving tines (26), such that ascending air current is deflected by said slots (25) in the region of the inlet gap (22), creating a suctioning effect for receiving stalks, and said tines (26) penetrating said slots (25) move towards the rotor (5) or the second row of counter-cutters (23) to transport stalks into the inlet gap (22) and prevent stalks from accumulating in the region of the inlet gap (22).

2. A straw-cutting machine in accordance with claim 1, wherein the counter-cutters (11;23) protrude into the circuit (17) of the cutting tools (7;30).

3. A straw-cutting machine in accordance with claim 1, wherein the tines (26) are disposed on a drivable roller (27).

4. A straw-cutting machine in accordance with claim 1, wherein the cutting tools (7) formed as catch plates are mounted for rotation upon the rotor (5) through holding plates (8) which can be fixedly mounted or rotatable around axes on the rotor (5).

5. A straw-cutting machine in accordance with claim 1, wherein the cutting tools formed as flail cutters (30) are hung in a floating manner upon axles (31) in turn mounted upon the rotor (5).

6. A straw-cutting machine for the chopping of stalks having a straw-cutting machine housing (4) in which a rotor (5) provided with cutting tools (7;30) and a drive is pivoted, having a guide plate forming a straw-cutting machine bottom (12) and having an outlet (13), wherein
   a first row of counter-cutters (11) is provided on the straw-cutting machine bottom (12),
   a second row of counter-cutters (23) is provided in a region of an inlet gap (22) defined between the bottom (12) and rotor (5) upstream of said first row of counter-cutters (11) in a direction of stalk flow, and
   the straw-cutting machine bottom (12) possesses step-shaped elevations (20) situated between the first and second rows of counter-cutters (11;23).

7. A straw-cutting machine for the chopping of stalks having a straw-cutting machine housing (4) in which a rotor (5) provided with cutting tools (7;30) and a drive is pivoted, having a guide plate forming a straw-cutting machine bottom (12) and having an outlet (13), wherein
   a first row of counter-cutters (11) is provided on the straw-cutting machine bottom (12),
   a second row of counter-cutters (23) is provided in a region of an inlet gap (22) defined between the bottom (12) and rotor (5) upstream of said first row of counter-cutters (11) in a direction of stalk flow,
   said first row of counter-cutters (11) is situated both underneath the rotor (5) and adjacent the outlet (13) of the straw-cutting machine,
   said first and second rows of counter-cutters (11;23) are respectively mounted upon cutter bars (10;24) in turn adjustably mounted upon the straw-cutting machine bottom (12) such that the rows of cutters (11;23) are adjustably mounted to be moved towards and away from an axis of rotation of the rotor (5),
   slots (25) are disposed in the straw-cutting machine bottom (12) upstream of the second row of the counter-cutters (23) in the direction of stalk flow, and
   curved tines (26) are rotatably mounted upon a roller (27) and situated to penetrate through the slots (25) through the straw-cutting machine bottom (12) as the tines (26) rotate, such that ascending air current is deflected by said slots (25) in the region of the inlet gap (22), creating a suctioning effect for receiving stalks, and said tines (26) penetrating said slots (25) move towards the rotor (5) or the second row of counter-cutters (23) and transport stalks into the inlet gap (22) and prevent stalks from accumulating in the region of the inlet gap (22).

8. A straw-cutting machine in accordance with claim 7, wherein the straw-cutting machine bottom (12) comprises step-shaped elevations (20) situated between the first row and second row of counter-cutters (11;23).

9. A straw-cutting machine for the chopping of stalks having a straw-cutting machine housing (4) in which a rotor (5) provided with cutting tools (7;30) and a drive is pivoted, having a guide plate forming a straw-cutting machine bottom (12) and having an outlet (13), wherein a row of counter-cutters (11) is provided on the straw-cutting machine bottom (12) underneath the rotor (5) and adjacent the outlet (13) of the straw-cutting machine, said row of counter-cutters (11) is mounted upon a cutter bar (10) in turn adjustably mounted upon the straw-cutting machine bottom (12) such that the row of cutters (11) is adjustably mounted to be moved towards and away from an axis of rotation of the rotor (5), slots (25) are disposed in the straw-cutting machine bottom (12) upstream of the row of counter-cutters (11) in a direction of stalk flow, and curved tines (26) are rotatably mounted upon a roller (27) and situated to penetrate through the slots (25) through the straw-cutting machine bottom (12) as the tines (26) rotate, such that ascending air current is deflected by said slots (25) in the region of an inlet gap (22) defined between said rotor (5) and bottom (12), creating a suctioning effect for receiving stalks, and said tines (26) penetrating said slots (25) move towards the rotor (5) and transport stalks into the inlet gap (22) and prevent stalks from accumulating in a region of the inlet gap (22).

10. A straw-cutting machine in accordance with claim 9, wherein the straw-cutting machine bottom (12) comprises step-shaped elevations (20) situated upstream of the row of counter-cutters (11) in the direction of stalk flow.

* * * * *